April 9, 1940.  J. BUTLER  2,196,520

BRAKE MECHANISM

Filed Sept. 2, 1938

Inventor
James Butler
by Frederick E. Bromley
ATTY.

Patented Apr. 9, 1940

2,196,520

UNITED STATES PATENT OFFICE 2,196,520

BRAKE MECHANISM

James Butler, Harrietsville, Ontario, Canada

Application September 2, 1938, Serial No. 228,196

7 Claims. (Cl. 188—78)

The invention generally appertains to improvements in brake mechanisms for motor vehicles and has for its primary object to produce a more efficient and serviceable shoe structure.

A further object of the invention is to provide a brake structure in which a shoe, having a curved face for engagement with a drum, is carried by supporting arms or links so inclined and disposed as to shift the shoe with a parallel movement in the operation of the expanding mechanism.

A still further object is to furnish a structure of this nature in which a complement of arcuate shoes is arranged within a drum and mounted upon arms or links so constituting an articulate supporting connection that each shoe is capable of parallel movement with respect to the contact face, and in which the shoes are arranged in opposing sets, the shoes of each set being swively connected to permit of free movement in the application of the resisting torque.

The invention is herein set forth in its preferred embodiment and it is to be understood that such changes and modifications may be resorted to as come within the spirit and scope of the appended claims.

Referring to the accompanying drawing.

Figure 1:
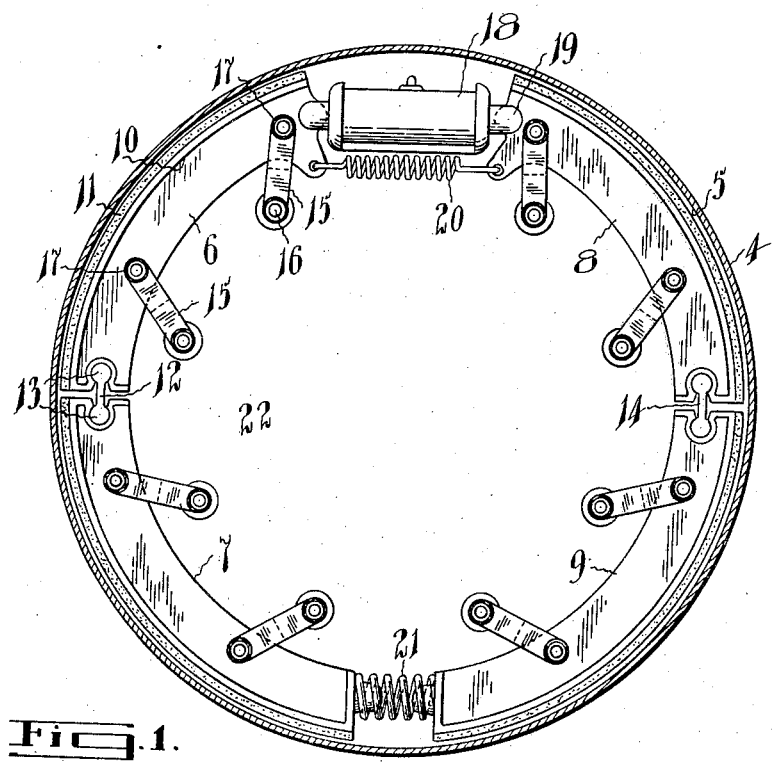
Figure 1 is a sectional elevation of the invention showing the shoes in disengaged position.
Figure 2:
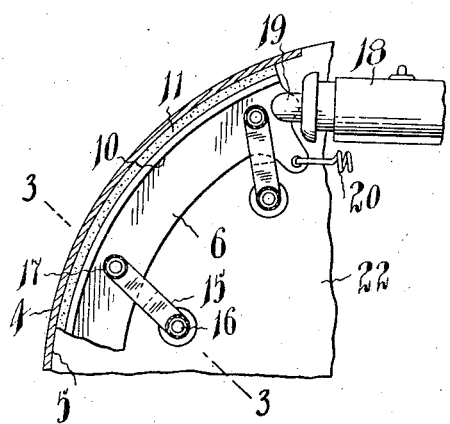
Figure 2 is a similar but fragmentary view depicting one of the shoes engaged with the drum.
Figure 3:
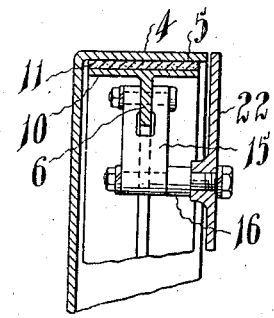
Figure 3 is a cross section taken on line 3—3 of Figure 2.

In the drawing, in which like numerals of reference denote similar parts, the numeral 4 generally designates the brake drum conventionally incorporated as part of a road wheel of a motor vehicle. The drum of course turns with the wheel as will be well understood in the art, and provides an internal annular friction surface 5 for engagement with the brake shoes, which are of the expanding type.

In performing the invention, I preferably supply a complement of shoes substantially composing a circle within the drum adjoining its annular portion. The shoes comprise two opposing sets, one of which consists of the shoes 6 and 7 and the other of the shoes 8 and 9. Each shoe, as will be evident from drawing, is in the form of an arc of a circle, and the arcuate outer face of the back 10 is, in the present disclosure, furnished with a customary lining 11 applied to it in suitable manner. The lining conforms to the curvature of the drum and its peripheral surface makes contiguous contact with the surface 5 for applying braking power.

The back 10 of each shoe is reinforced by a suitable web structure such as that indicated at 11, which produces a T-shaped cross section.

The shoes 6 and 7 are coupled by a connecting member 12 that unites them for unitary movement and at the same time affords an articulate juncture to permit each of these shoes to shift bodily on its own supporting structure. The coupling is shown by way of example but not of limitation as consisting of a link retaining the adjacent ends of the shoes in slightly spaced relation and having enlarged termini 13 fitted in circular openings to effect a swivel connection.

The other pair of shoes 8 and 9 have their adjoining ends likewise connected by a connecting member 14.

Of the complement of shoes, each is individually carried by a pair of arms or links 15 that extend in a general inward direction and are pivotally united to the non-rotatable side plate 22 encircling the axle of the wheel. The pivotal connections of the arms or links with the side plate may consist of studs 16 or other suitable elements. The arms or links are also pivotally connected to the shoe at their outer ends as at 17, for which purpose they may be bifurcated to straddle the web 11 and receive the pivotal member.

According to this construction, it will be manifest that each shoe is constrained to an outward and inward movement accompanied by a circular motion due to the swing of the arms or links 15 on their fulcrum studs 16. The outer ends of the arms or links oscillate in the arc of a circle in the operation of the shoes. By employing a pair of arms or links to each shoe a parallel movement is secured throughout the length of the shoe so as to bring its entire friction face into engagement with the drum in the application of the braking force.

The opposing sets of shoes may be expanded into contact with the drum by any suitable expedient known in the art, such as for instance by the auxiliary cylinder 18 of a conventional hydraulic device that is actuated by a master cylinder controlled by the usual operating mechanism. The juxtapositioned ends of the shoes 6 and 8 are connected to the auxiliary cylinder by elements 19 so as to be spread thereby and thus transmit their movement to the shoes 7 and 9 respectively connected thereto by the members 12 and 14.

In order to normally retain the shoes in contracted position, as clearly shown in Figure 1, a tension spring 20 is located alongside of the auxiliary cylinder 18 and a compression spring 21 is disposed at the diametrically opposite side of the drum.

An important feature of construction is that each arm or link 15 is so inclined with respect to a radial line from the drum axis that both sets of shoes are swung outwardly under the influence of the expanding mechanism. Consequently the arms or links have a tendency to increase the braking force in both the forward and the reverse travel of the vehicle due to the resultant wedging action.

From the preceding description it will be manifest that this construction provides a simple and practical mechanism of a reliable and serviceable nature. Furthermore, it will be apparent that the invention could be applied to a standard brake by mounting the arms or links 15 on a support and securing it to the ordinary side plate.

What I claim is:

1. In an internal expanding brake mechanism, a non-rotatable support, a complement of segmental shoes each of an arcuate shape and having a peripheral friction face, said shoes being disposed in circular formation and arranged in two diametrically opposite sets each of which contains a plurality of shoes, a coupling element linking adjacent ends of each set of shoes so as to provide for independent play in a radial plane, inclined parallel-motion links anchoring each shoe to the aforesaid support, the links of one set of shoes being inclined oppositely to those of the other, an expanding device interposed between one pair of adjacent ends of the opposite sets, and spring means for contracting the sets.

2. In an internal expanding brake mechanism, a stationary supporting plate, a complement of segmental shoes each incurvate and having a peripheral friction face for engaging a drum, said shoes being disposed in substantially end-to-end relation and forming two diametrically opposite sets each of which comprises two shoes presenting an approximate semi-circular contact surface, an elongated coupling element swivelly connected to adjacent ends of the shoes of each set and interposed therebetween without physical connection with any anchoring means whereby the shoes are caused to operate in unison but are free to bear uniformly against the drum, and inclined parallel-motion links connecting each shoe to the aforesaid support, the links of one set of shoes being inclined oppositely to those of the other.

3. In an internal expanding brake mechanism, a pair of arcuate shoes arranged circularly in end-to-end relation but with a margin of space between the adjoining ends, a coupling member free of physical connection with anchoring means and interposed between said ends and extending directly from one to the other thereof, said coupling member having opposite termini of which one terminus is swivelly attached to one of said ends and the other terminus is likewise attached to the other of said ends, whereby said shoes have independent play in a radial plane, and means anchoring the shoes to cause them to shift radially with an attendant circular motion when actuated.

4. In an internal expanding brake mechanism, a pair of arcuate shoes arranged circularly in end-to-end relation but with a margin of space between the adjoining ends, a coupling member free of physical connection with anchoring means and interposed between said ends and extending directly from one to the other thereof, said coupling member having opposite termini of which one terminus is swivelly attached to one of said ends and the other terminus is likewise attached to the other of said ends, whereby said shoes have independent play in a radial plane, and inclined parallel-motion links anchoring each shoe to a support.

5. In an internal expanding brake mechanism, a pair of arcuate shoes arranged circularly in end-to-end relation with adjacent ends terminating short of each other to provide an intervening space, the opposing faces of the adjacent ends having openings leading inwardly and circularly enlarged, a coupling member interposed between said ends and extending directly from one opening to the other and having terminal enlargements seated in the enlarged portions of the said openings whereby a link connection is effected that operates to transmit motion of one shoe to the other with an attendant independent play of the shoes in a radial plane, an inclined parallel-motion links anchoring each shoe to a support.

6. In an internal expanding brake mechanism, a pair of shoes anchored for expanding into engagement with a drum, said shoes being arranged in end-to-end relation with adjacent ends terminating short of each other to provide an intervening space, the opposing faces of the adjacent ends having openings leading inwardly and circularly enlarged, a coupling member interposed between said ends and extending directly from one opening to the other and having terminal enlargements seated in the enlarged portions of the said openings whereby a link connection is effected that operates to transmit motion of one shoe to the other with an attendant independent play between said shoes in a radial plane.

7. In an internal expanding brake mechanism, a complement of segmental shoes each incurvate and having a peripheral friction face for engaging a drum, said shoes being disposed in substantially end-to-end relation and forming two diametrically opposite sets each of which comprises two shoes presenting an approximate semi-circular contact surface, the inner ends of the shoes of each set terminating short of each other to provide an intervening space, the opposing faces of these inner ends having openings leading inwardly and circularly enlarged, a coupling member interposed between said ends of each set and extending directly from one opening to the other thereof and having terminal enlargements seated in the enlarged portions of the openings whereby a link connection is effected that operates to transmit action of one shoe to the other of the set with an attendant play in a radial plane, a non-rotatable support, inclined parallel-motion links anchoring the shoes of each set to said support, the links of one set of shoes being inclined oppositely to those of the other, an expanding device interposed between one pair of adjacent outer ends of the opposing sets, and spring means for contracting the sets.

JAMES BUTLER.